United States Patent
Espy (10) Patent No.: US 9,675,085 B2
(45) Date of Patent: Jun. 13, 2017

(54) FLUID DISTRIBUTION SYSTEMS, CABINET ASSEMBLIES INCLUDING FLUID DISTRIBUTION SYSTEMS AND RELATED ASSEMBLIES AND METHODS

(71) Applicant: BIRKO Corporation, Henderson, CO (US)

(72) Inventor: Thomas Espy, Marshfield, MO (US)

(73) Assignee: BIRKO CORPORATION, Henderson, CO (US)

(*) Notice: Subject to any disclaimer, the term of this patent is extended or adjusted under 35 U.S.C. 154(b) by 411 days.

(21) Appl. No.: 14/219,917

(22) Filed: Mar. 19, 2014

(65) Prior Publication Data

US 2015/0264942 A1    Sep. 24, 2015

(51) Int. Cl.
*A22C 11/00* (2006.01)
*A22B 5/00* (2006.01)
*F16K 11/076* (2006.01)

(52) U.S. Cl.
CPC .......... *A22B 5/0082* (2013.01); *F16K 11/076* (2013.01); *Y10T 137/86863* (2015.04)

(58) Field of Classification Search
CPC ..... A22C 21/0061; A22C 17/16; A22C 17/14; A22C 17/08; A22B 5/08; A22B 5/0082
USPC .................................................. 452/123, 173
See application file for complete search history.

(56) References Cited

U.S. PATENT DOCUMENTS

| | | | |
|---|---|---|---|
| 1,031,642 A | 7/1912 | Haase | |
| 1,254,248 A | 1/1918 | Lowry | |
| 2,029,837 A | 2/1936 | Schmid | |
| 3,178,763 A | 4/1965 | Kolman | |
| 3,523,326 A | 8/1970 | Ambill | |
| 3,657,768 A | 4/1972 | Snowden | |
| 4,095,610 A * | 6/1978 | Priesmeyer | E03C 1/0408 137/100 |

(Continued)

FOREIGN PATENT DOCUMENTS

| | | |
|---|---|---|
| AU | 719374 | 8/1998 |
| CN | 201839749 | 5/2011 |

(Continued)

OTHER PUBLICATIONS

Check Valves; www.TPUB.COM; Intetraged Publishing; downloaded Feb. 12, 2014; 2 pages.

*Primary Examiner* — Richard Price, Jr.
(74) *Attorney, Agent, or Firm* — Magleby Cataxinos & Greenwood (57) ABSTRACT

Fluid distribution systems for use in meat-handling facilities include a fluid distribution assembly for fluidly coupling with a fluid supply where the fluid distribution assembly comprises at least one valve for alternately supplying fluid to a first nozzle assembly and a second nozzle assembly. The fluid distribution assembly may further include at least one motor for oscillating the nozzle assemblies. Cabinet assemblies for use in meat-handling facilities may include a fluid distribution system. Valve assemblies may include a diverter for selectively supplying fluid to at least two outlets. Methods of washing at least a portion of a carcass include spraying fluid onto the at least a portion of the carcass with a first set of nozzle assemblies and with a second set of nozzle assemblies positioned over the first set of nozzle assemblies.

15 Claims, 4 Drawing Sheets

(56) References Cited

U.S. PATENT DOCUMENTS

| | | | |
|---|---|---|---|
| 4,279,059 A * | 7/1981 | Anderson | A22B 5/08 |
| | | | 452/173 |
| 4,337,549 A | 7/1982 | Anderson et al. | |
| 4,829,637 A | 5/1989 | Norrie | |
| 4,862,557 A | 9/1989 | Clayton et al. | |
| 4,965,911 A | 10/1990 | Davey | |
| 5,045,021 A | 9/1991 | Borup | |
| 5,291,906 A | 3/1994 | White | |
| 5,326,308 A | 7/1994 | Norrie | |
| 5,334,084 A | 8/1994 | O'Brien et al. | |
| 5,484,332 A * | 1/1996 | Leech | A23B 4/26 |
| | | | 452/173 |
| 5,520,575 A | 5/1996 | Dickson | |
| 5,605,503 A | 2/1997 | Martin | |
| 5,651,730 A | 7/1997 | McGinnis et al. | |
| 5,853,320 A | 12/1998 | Wathes et al. | |
| 5,882,253 A * | 3/1999 | Mostoller | A22C 21/0061 |
| | | | 452/173 |
| 5,915,849 A * | 6/1999 | Dongo | A61H 33/027 |
| | | | 4/492 |
| 5,938,519 A * | 8/1999 | Wright | A22C 21/04 |
| | | | 452/173 |
| 5,980,375 A | 11/1999 | Anderson et al. | |
| 5,988,219 A * | 11/1999 | Larsen | F16K 11/0853 |
| | | | 137/625.43 |
| 6,142,861 A | 11/2000 | Buhot et al. | |
| 6,196,912 B1 | 3/2001 | Lawler, Jr. et al. | |
| 6,203,415 B1 * | 3/2001 | Torrance-Castanza | B24B 23/026 |
| | | | 173/DIG. 1 |
| 6,220,951 B1 | 4/2001 | Clayton et al. | |
| 6,277,207 B1 | 8/2001 | Gauthier | |
| 6,644,352 B1 | 11/2003 | Pfetzer | |
| 6,733,379 B2 | 5/2004 | Tsang | |
| 6,807,973 B2 | 10/2004 | Fratello et al. | |
| 7,022,005 B2 | 4/2006 | Potter et al. | |
| 7,134,957 B2 | 11/2006 | Clayton et al. | |
| 7,207,879 B2 | 4/2007 | Kelly et al. | |
| 7,438,075 B1 | 10/2008 | Huntington et al. | |
| 7,458,886 B1 | 12/2008 | Griffiths et al. | |
| 7,467,994 B2 | 12/2008 | Griffiths et al. | |
| 7,559,333 B2 | 7/2009 | Belanger | |
| 7,566,260 B1 | 7/2009 | Griffiths et al. | |
| 7,575,509 B2 | 8/2009 | Chattin et al. | |
| 7,648,412 B2 | 1/2010 | Kjeldsen | |
| 8,012,002 B2 * | 9/2011 | Brown | A22B 5/0082 |
| | | | 452/173 |
| 8,246,429 B2 * | 8/2012 | Hilgren | A22C 21/0061 |
| | | | 452/123 |
| 8,684,799 B2 * | 4/2014 | Brink | A22C 21/0061 |
| | | | 452/173 |
| 2004/0147211 A1 | 7/2004 | Mostoller | |
| 2006/0251774 A1 | 11/2006 | Osborn | |
| 2011/0101133 A1 | 5/2011 | Espy | |
| 2013/0255282 A1 | 10/2013 | Heston | |

FOREIGN PATENT DOCUMENTS

| | | |
|---|---|---|
| CN | 202514506 | 11/2012 |
| CN | 202890361 | 4/2013 |
| CN | 203040553 | 7/2013 |
| EP | 0738109 | 5/1998 |
| FR | 2522474 | 9/1983 |
| FR | 2524769 | 10/1983 |
| WO | 9320701 | 10/1993 |
| WO | 9833390 | 8/1998 |
| WO | WO9833390 | 8/1998 |
| WO | 0035495 | 6/2000 |

* cited by examiner

FLUID DISTRIBUTION SYSTEMS, CABINET ASSEMBLIES INCLUDING FLUID DISTRIBUTION SYSTEMS AND RELATED ASSEMBLIES AND METHODS

TECHNICAL FIELD

Embodiments of the present disclosure relate to fluid distribution systems and, more particularly, to fluid distribution systems including one or more alternating nozzle assemblies for use in, for example, supplying a fluid to at least a portion of a carcass in meat-handling facilities.

BACKGROUND

Meat packing houses or slaughter houses utilize a variety of machinery to clean animal carcasses. Washing machines that spray pressurized jets of water onto animal carcasses are generally known within the industry. In packing houses for large animals, such as, for example, beef or pork facilities, washing devices have been used that include a number of spaced apart spray bars, each bar having a plurality of openings through which pressurized water is sprayed directly onto an animal carcass to remove debris, blood, and the like.

These systems may include two (2) or more spray assemblies spaced apart to form an alleyway. Carcasses, often hanging from shackles, are transported along the alleyway (e.g., via a rail system) between the rows of spray bars so that substantially all sides of the carcass are washed.

It is also common for the spray bars to be mounted on racks to form a sprayer wall assembly. Multiple spray bars are spaced apart and aligned such that the spray nozzles on each spray bar are generally oriented in the same direction, aimed generally inward of the alleyway. It should be understood that the orientation of the spray bars and spray wall assemblies can vary. Regardless of the spray wall orientation or composition, animal carcasses are transported between the spaced apart sprayer walls such that the sides of the carcass are sprayed.

Known spray devices include a water source that is connected to a water valve. The water valve or swivel body directs the water source through an impeller shaft into a water spray line. Pressurized water is then forced through spray nozzles or jets formed into each water line for application directly onto the animal carcass.

BRIEF SUMMARY

In some embodiments, the present disclosure includes a fluid distribution system for use in a meat-handling facility. The fluid distribution system includes a plurality of nozzle assemblies, wherein a first nozzle assembly of the plurality of nozzle assemblies is positioned over a second nozzle assembly of the plurality of nozzle assemblies, and a fluid distribution assembly for fluidly coupling with a fluid supply. The fluid distribution assembly is fluidly coupled to the plurality of nozzle assemblies and comprises at least one valve for alternately supplying fluid to the first nozzle assembly and the second nozzle assembly of the plurality of nozzle assemblies.

In additional embodiments, the present disclosure includes cabinet assembly for use in a meat-handling facility. The cabinet assembly includes a housing defining a pathway through the housing between a first lateral side of the housing and a second lateral side of the housing where the pathway is for conveying at least a portion of a carcass through the housing. The cabinet assembly further includes a first plurality of nozzle assemblies disposed on the first lateral side of the housing where the first plurality of nozzle assemblies comprise a first set of nozzle assemblies and a second set of nozzle assemblies and where at least one nozzle assembly of the first set of nozzle assemblies is positioned over at least one nozzle assembly of the second set of nozzle assemblies. The cabinet assembly further includes a second plurality of nozzle assemblies disposed on the second lateral side of the housing where the second plurality of nozzle assemblies comprises a third set of nozzle assemblies and a fourth set of nozzle assemblies and where at least one nozzle assembly of the third set of nozzle assemblies is positioned over at least one nozzle assembly of the fourth set of nozzle assemblies. The cabinet assembly further includes a fluid distribution assembly for fluidly coupling with a fluid supply and fluidly coupled to the first plurality of nozzle assemblies and the second plurality of nozzle assemblies where the fluid distribution assembly comprises at least one valve for alternately supplying fluid between the first set of nozzle assemblies and the second set of nozzle assemblies of the first plurality of nozzle assemblies and for alternately supplying fluid between the third set of nozzle assemblies and the fourth set of nozzle assemblies of the second plurality of nozzle assemblies.

In yet additional embodiments, the present disclosure includes a valve assembly for alternately supplying fluid to a fluid distribution system. The valve assembly includes a housing, at least one fluid inlet configured to be coupled to a fluid supply, at least two fluid outlets configured to be coupled to at least two valve assemblies of the fluid distribution system, a diverter disposed within the housing and having at least one aperture formed therein, an inlet chamber formed within the housing and positioned on one side of the diverter, and at least two outlet chambers formed within the housing and positioned on another side of the diverter. Movement of the diverter is configured to selectively position the at least one fluid inlet in communication with a first fluid outlet of the at least two fluid outlets via the inlet chamber, the at least one aperture of the diverter, and one outlet chamber of the at least two outlet chambers in a first position of the diverter and to selectively position the at least one fluid inlet in communication with a second fluid outlet of the at least two fluid outlets via the inlet chamber, the at least one aperture of the diverter, and another outlet chamber of the at least two outlet chambers in a second position of the diverter.

In yet additional embodiments, the present disclosure includes method of washing at least a portion of a carcass. The method includes conveying at least a portion of a carcass in a direction through a fluid distribution system comprising a first set of nozzle assemblies and a second set of nozzle assemblies positioned over the first set of nozzle assemblies, spraying fluid onto the at least a portion of the carcass with the first set of nozzle assemblies, and after spraying fluid onto the at least a portion of the carcass with the first set of nozzle assemblies, spraying fluid onto the at least a portion of the carcass with the second set of nozzle assemblies.

DETAILED DESCRIPTION

In the following detailed description, reference is made to the accompanying drawings that depict, by way of illustration, specific example embodiments in which the disclosure may be practiced. However, other embodiments may be utilized, and structural, logical, and configurational changes may be made without departing from the scope of the disclosure. The illustrations presented herein are not meant to be actual views of any particular systems, assembly, method, or component thereof, but are merely idealized representations that are employed to describe example embodiments of the present disclosure. Elements common between drawings may retain the same numerical designation.

Figure 1:
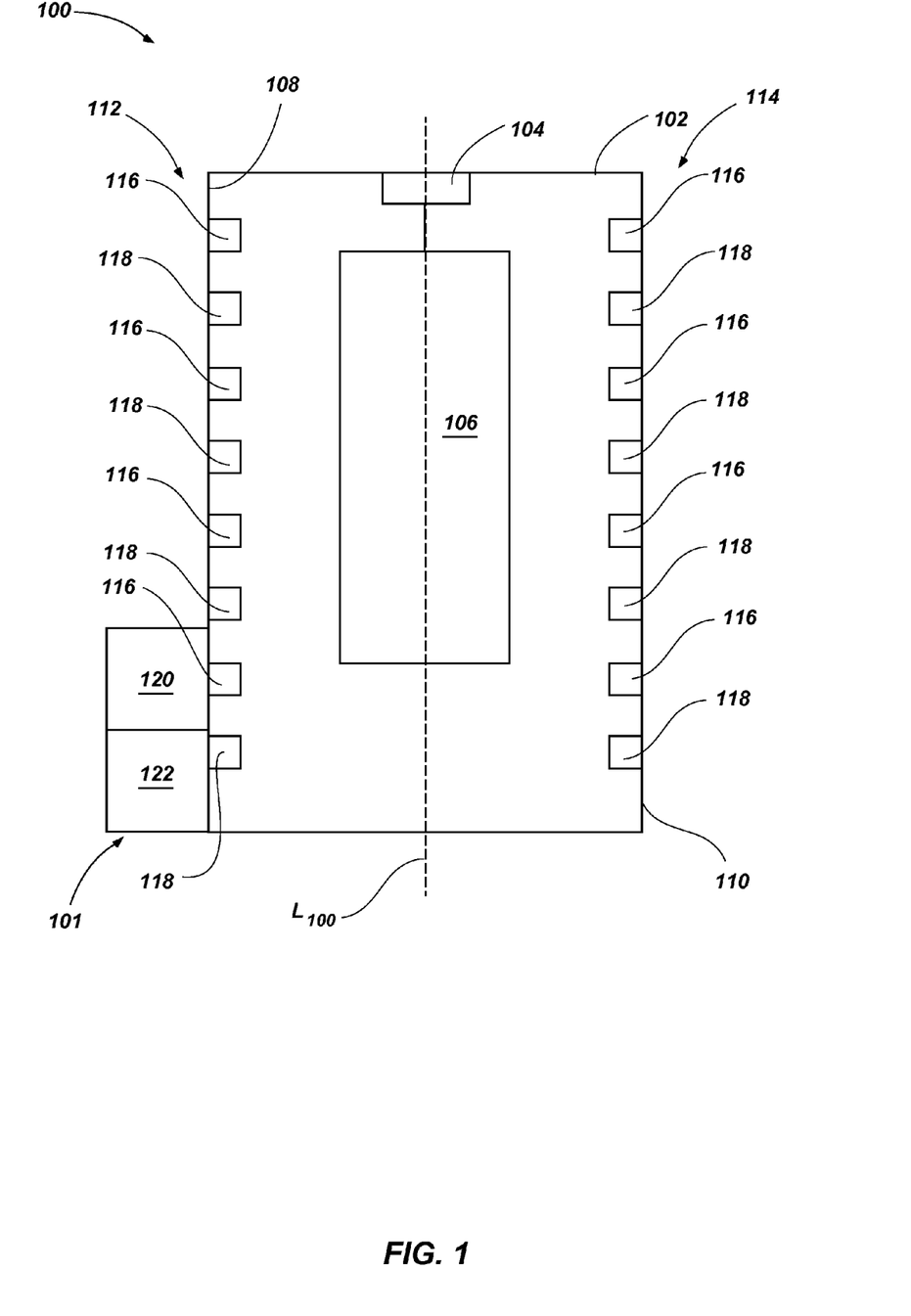
FIG. 1 is a simplified and schematically illustrated view of a cabinet assembly for use in a meat-handling facility including a fluid distribution system in accordance with an embodiment of the present disclosure.

FIG. 1 is a simplified and schematically illustrated view of a cabinet assembly 100 for use in a meat-handling facility including a fluid distribution system 101. As shown in FIG. 1, cabinet assembly 100 may include a housing 102 having openings on either end of the cabinet assembly 100 for transporting at least a portion of one or more animal carcasses 106 (e.g., an entire carcass, a head portion or portions, tripe, or combinations thereof) through a pathway or alleyway of the cabinet assembly 100 (e.g., via an overhead rail system 104). In some embodiments, the housing 102 of the cabinet assembly 100 may be at least partially enclosed, with two open ends where the carcasses 106 enter and exit, respectively, the housing 102 of the cabinet assembly 100. In other embodiments, the cabinet assembly 100 may be partially or substantially (e.g., entirely) open (e.g., the cabinet assembly 100 may be substantially open with only the fluid distribution system 101 flanking a pathway through the cabinet assembly 100).

The cabinet assembly 100 includes a fluid distribution system 101 for supplying one or more fluids (e.g., a fluid prewash supplying, for example, fluid composed of water and/or other chemicals, such as, for example, bromine, lactic acid, etc.) to the carcasses 106 as the carcasses 106 are conveyed (e.g., via the overhead rail system 104) through the cabinet assembly 100. As depicted, nozzle assemblies (e.g., a first plurality of nozzle assemblies 112 and a second plurality of nozzle assemblies 114) may be positioned on one or more sides (e.g., a first lateral side 108 and a second lateral side 110) the cabinet assembly 100. For example, the first plurality of nozzle assemblies 112 may be positioned on the first side 108 of the cabinet assembly 100 and the second plurality of nozzle assemblies 114 may be positioned on the second side 110 of the cabinet assembly 100 opposing the first side 108.

Each of the first plurality of nozzle assemblies 112 and the second plurality of nozzle assemblies 114 may include one or more alternating nozzle assemblies (e.g., spray bars, arbors). For example, each of the first plurality of nozzle assemblies 112 and the second plurality of nozzle assemblies 114 may include interspersed nozzle assemblies 116 and nozzle assemblies 118. In some embodiments, the nozzle assemblies 116, 118 may be alternated such that the fluid distribution system 101 is configured to separately supply fluid to the nozzle assemblies 116 and the nozzle assemblies 118 (e.g., the fluid distribution system 101 is configured to supply fluid to the nozzle assemblies 116 independent of the nozzle assemblies 118 and vice versa). In some embodiments, the nozzle assemblies 116, 118 may be alternated such that the fluid distribution system 101 is configured to separately oscillate the nozzle assemblies 116 and the nozzle assemblies 118 (e.g., the fluid distribution system 101 is configured to oscillate the nozzle assemblies 116 independent of the nozzle assemblies 118 and vice versa). For example, the fluid distribution system 101 may move the nozzle assemblies 116 in a first rotational direction while moving the nozzle assemblies 118 in a second rotational direction (e.g., opposite the first rotational direction). In some embodiments, the nozzle assemblies 116, 118 may be alternated such that the fluid distribution system 101 is configured to both separately supply fluid to and to separately oscillate the nozzle assemblies 116 and the nozzle assemblies 118.

Each of the nozzle assemblies 116, 118 includes one or more nozzles, as discussed in greater detail below. For example, the pluralities of nozzle assemblies 112, 114 may each include alternating nozzle assemblies 116, 118 (e.g., odd number nozzle assemblies 116 and even number nozzle assemblies 118 arranged in columns). While FIG. 1 illustrates the nozzle assemblies 116, 118 alternating in a 1:1 pattern, in other embodiments, other patterns of alternation may be employed (e.g., 2:1, 2:2, 3:1, 3:3, or combinations thereof, etc.). While FIG. 1 illustrates eight nozzle assemblies 116, 118 of each plurality of nozzle assemblies 112, 114 on each side 108, 110 of the cabinet assembly 100, in other embodiments, one or both of the sides 108, 110 of the cabinet assembly 100 may include any suitable number of nozzle assemblies 116, 118 (e.g., between two and sixteen nozzle assemblies 116, 118, between ten and twelve nozzle assemblies 116, 118, etc.).

In some embodiments, the nozzle assemblies 116, 118 may be similar to those described in U.S. patent application Ser. No. 12/939,270, filed Nov. 4, 2010 and entitled "Sprayer Swivel Body for Packing House Washer," the disclosure of which is incorporated herein in its entirety by this reference.

As depicted, each of the nozzle assemblies 116, 118 may be positioned vertically in columns extending along (e.g., substantially parallel to) a longitudinal axis $L_{100}$ of the cabinet assembly 100 on respective sides 108, 110 of the cabinet assembly 100. For example, each of the nozzle assemblies 116, 118 may be positioned vertically in columns (e.g., over one another) in a direction transverse (e.g., perpendicular to) to the pathway through the cabinet assembly 100. Each of the nozzle assemblies 116, 118 may have a longitudinal axis along which a plurality of nozzles is positioned as discussed in greater detail below where the longitudinal axes of the nozzle assemblies 116, 118 are oriented transverse to (e.g., perpendicular to) a longitudinal axis $L_{100}$ of the cabinet assembly 100 and substantially parallel to the pathway through the cabinet assembly 100.

The fluid distribution system 101 may include a fluid distribution assembly 120 (e.g., one or more valves for alternately supplying fluid to the nozzle assemblies 116, 118, one or more motors for oscillating the nozzle assemblies 116, 118, as discussed in further detail below) and a fluid supply 122 to which the fluid distribution assembly 120 is fluidly coupled.

Figure 2:
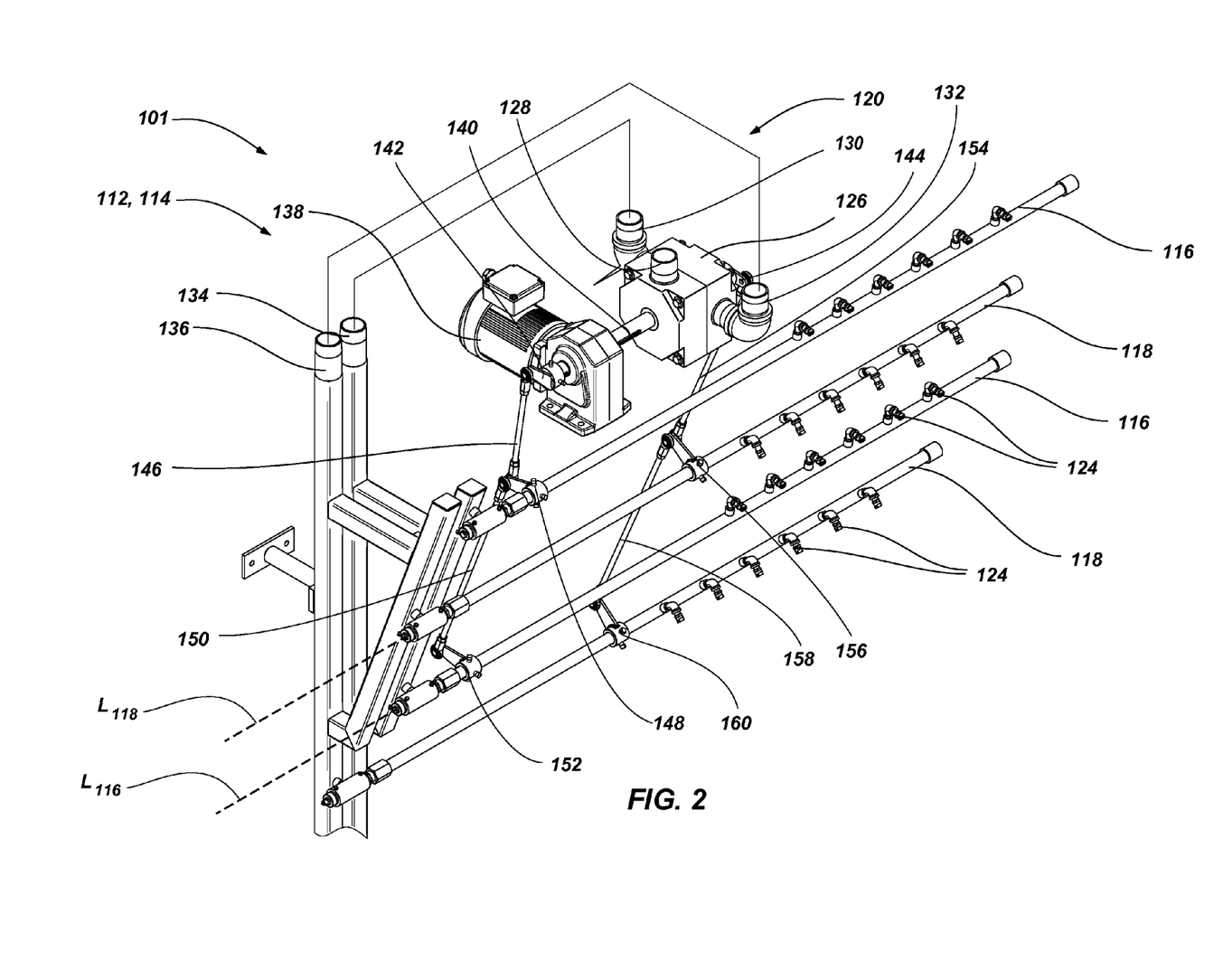
FIG. 2 is a perspective view of a water distribution system in accordance with an embodiment of the present disclosure.

FIG. 2 is a perspective view of a water distribution system (e.g., water distribution system 101 schematically illustrated in FIG. 1). As shown in FIG. 2, water distribution system 101 includes a plurality of nozzle assemblies (e.g., the first plurality of nozzle assemblies 112 or the second plurality of nozzle assemblies 114) that may be positioned in the cabinet assembly 100 as depicted in FIG. 1 (e.g., in one or more racks). While only one plurality of nozzle assemblies is depicted in FIG. 2, it will be appreciate that the cabinet assembly 100 may include more than one pluralities of nozzle assemblies 112, 114 (e.g., as depicted in FIG. 1) positioned in the cabinet assembly 100 (e.g., on opposing sides to flank a pathway of the carcasses 106 that are to be conveyed through the cabinet assembly 100). The plurality of nozzle assemblies 112, 114 includes the nozzle assemblies 116, 118 each including one or more nozzles 124 extending along a longitudinal axes $L_{116}$, $L_{118}$ of the nozzle assemblies 116, 118 (e.g., along a bar or tube of the nozzle assemblies 116, 118 having a fluid passageway formed therethrough).

The fluid distribution system 101 includes the fluid distribution assembly 120 including one or more valves (e.g., fluid distribution valve 126) for alternately supplying fluid to the nozzle assemblies 116, 118. The fluid distribution valve 126 includes an inlet 128 that is fluidly coupled to a fluid supply 122 (FIG. 1) and one or more outlets. For example, the fluid distribution valve 126 may include a first outlet 130 fluidly coupled to a first fluid supply line 134 that is fluidly coupled to and supplies nozzle assemblies 116 and a second outlet 132 fluidly coupled to a second fluid supply line 136 that is fluidly coupled to and supplies nozzle assemblies 118. The fluid distribution valve 126 includes a diverter (e.g., diverter 208 shown and described with reference to FIGS. 3 through 5) that alternates the supply of fluid from the inlet 128 to one of the first outlet 130 and the second outlet 132. While FIG. 2 depicts valve 126 as a three-way valve including one inlet 128 and two outlets 130, 132, in other embodiments, the fluid distribution assembly 120 may comprise any suitable valve configuration capable of alternately supplying fluid between the nozzle assemblies 116 and nozzle assemblies 118. For example, the fluid distribution assembly 120 may include two, two-way valves, each coupled to one of the nozzle assemblies 116, 118 that may be alternately opened and closed to provide fluid to the nozzle assemblies 116, 118.

The fluid distribution assembly 120 includes one or more motors (e.g., motor 138) for oscillating the nozzle assemblies 116, 118. For example, the motor 138 may oscillate the nozzle assemblies 116, 118 back and forth through the rotation of the nozzle assemblies 116, 118 about the longitudinal axes $L_{116}$, $L_{118}$ of the nozzle assemblies 116, 118 (e.g., in a direction transverse (e.g., perpendicular to) the pathway through the cabinet assembly 100 (FIG. 2)). The motor 138 may include a drive shaft 140 having one or more linkages (e.g., a first cam 142 and a second cam 144) coupled to the nozzle assemblies 116, 118. As depicted, the first cam 142 may be coupled to nozzle assemblies 116 by a first linkage 146 (e.g., a fixedly coupled follower). For example, the first cam 142 may be coupled to a first nozzle assembly 116 (e.g., an odd number nozzle assembly 116 positioned adjacent to an even number nozzle assembly 118) of the nozzle assemblies 116 via bracket 148. The first cam 142 may be further connected to any number of additional nozzle assemblies 116 (e.g., odd number nozzle assemblies 116 interspersed with even number nozzle assemblies 118) of the nozzle assemblies 116 (e.g., via additional linkages 150 and brackets 152). The second cam 144 may be coupled to nozzle assemblies 118 by a second linkage 154 (e.g., a fixedly coupled follower). For example, the second cam 144 may be coupled to a first nozzle assembly 118 (e.g., an even number nozzle assembly 118 positioned adjacent to at least one odd number nozzle assembly 116) of the nozzle assemblies 118 via bracket 156. The second cam 144 may be further connected to any number of additional nozzle assemblies 118 (e.g., even number nozzle assemblies 118 interspersed with odd number nozzle assemblies 116) of the nozzle assemblies 118 (e.g., via additional linkages 158 and brackets 160).

The first cam 142 and the second cam 144 are coupled to and driven by the drive shaft 140 of the motor 138 (e.g., coupled on opposing longitudinal ends of the drive shaft 140). The first cam 142 and the second cam 144 may be offset such that the motor 138 moves the nozzle assemblies 116 is a first direction and the nozzle assemblies 118 in a second direction for a selected time period. For example, the first cam 142 and the second cam 144 may be offset 180 degrees (e.g., may oppose or mirror each other) such that rotation of the drive shaft 140 of the motor 138 will move (e.g., rotate) the nozzle assemblies 116 in a first rotational direction (e.g., an upward rotational direction, upstroke) as the first cam 142 pushes the majority of the linkage 146 away from the motor 138 and will move (e.g., rotate) the nozzle assemblies 118 in a second rotational direction (e.g., opposite the first rotational direction, a downward rotational direction, downstroke) as the second cam 144 pulls the majority of the linkage 154 toward from the drive shaft 140.

As depicted, the nozzles 124 of the nozzle assemblies 116 are shown moving in the upward direction (e.g., upstroke) and the nozzles 124 of the nozzle assemblies 118 are shown moving in the downward direction (e.g., downstroke) where upward and downward are defined relative to a surface, floor, or other structure on which the cabinet assembly 100 (FIG. 2) is disposed. The nozzle assemblies 116, 118 may be offset such that the nozzles 124 of the nozzle assemblies 116 are in an uppermost position while the nozzles 124 of the nozzle assemblies 116 are in a lowermost position. In some embodiments, the rotational offset between the nozzles 124 of the nozzle assemblies 116 and the nozzles 124 of the nozzle assemblies 118 may be between 45 and 180 degrees (e.g., between 80 and 130 degrees, 80 degrees, 90 degrees, 110 degrees, 120 degrees, 130 degrees, etc.)

In some embodiments, the drive shaft 140 of the motor 138 may also act to drive the fluid distribution valve 126. For example, the drive shaft 140 may rotate a diverter of the fluid distribution valve 126 in order to alternate supply of a fluid between the nozzle assemblies 116, 118.

In some embodiments, the fluid distribution assembly 120 (e.g., the motor 138 and the fluid distribution valve 126) may act in unison to provide fluid to the nozzle assemblies 116, 118 only when the nozzle assemblies 116, 118 are moving in a selected direction. For example, the motor 138 and the fluid distribution valve 126 may only supply fluid to the nozzle assemblies 116, 118 when the nozzle assemblies 116, 118 are moving in one of the first direction (e.g., the upward direction) and the second direction (e.g., the downward direction). By way of further example, the motor 138 and the fluid distribution valve 126 may only supply fluid to the nozzle assemblies 116, 118 when the nozzle assemblies 116, 118 are rotating in the downward direction. In such an embodiment, as nozzle assemblies 116 move in the downward direction and nozzle assemblies 118 move in the opposite upward direction, fluid is supplied only to the nozzle assemblies 116 by the fluid distribution valve 126. Similarly, as nozzle assemblies 118 move in the downward direction and nozzle assemblies 116 move in the opposite upward direction, fluid is supplied only to the nozzle assemblies 118 by the fluid distribution valve 126.

In some embodiments, the motor 138 may oscillate the nozzle assemblies 116, 118 back and forth between the uppermost position and the lowermost position in a selected time interval (e.g., one to four times per second, one to three seconds per interval, etc.).

The nozzle assemblies 116, 118 may be movably coupled (e.g., rotatably coupled) to an adjacent structure (e.g., another portion of the cabinet assembly 100 (FIG. 1)) with one or more brackets (e.g., brackets including one or more bearing assemblies).

In operation, the nozzles 124 of the nozzle assemblies 116, 118 may be oscillated back and forth along an arc between an uppermost position and a lowermost position by the motor 138. The motor 138 may include one or more mechanisms (e.g., the first cam 142 and the second cam 144) to alternately move the nozzles 124 of the nozzle assemblies 116 and the nozzles 124 of the nozzle assemblies 118 separate from each other. The fluid distribution valve 126 may selectively supply fluid to each nozzle assemblies 116, 118 while the nozzle assemblies 116, 118 are being rotated by the motor 138. For example, the fluid distribution valve 126 may supply fluid to each nozzle assemblies 116, 118 only when the nozzles 124 of nozzle assemblies 116, 118 are moving in a downward direction (e.g., downstroke). In some embodiments, the motor 138 may also drive a diverter of the fluid distribution valve 126.

Figure 3:
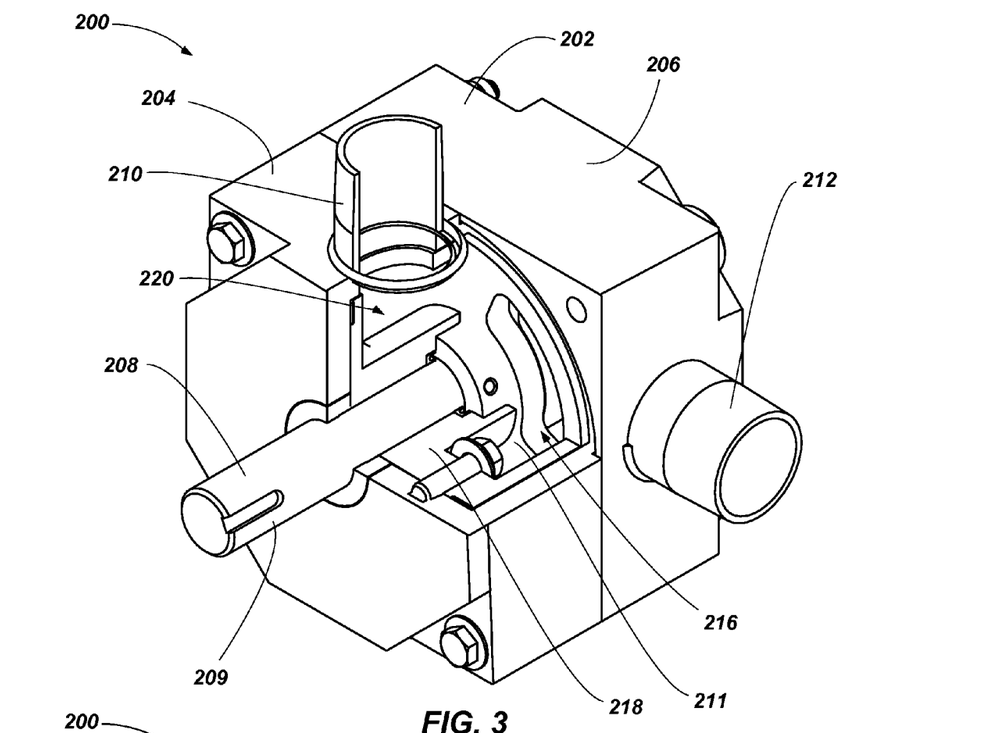
FIG. 3 is a perspective view of a fluid distribution valve in accordance with an embodiment of the present disclosure with a portion of the fluid distribution valve being cutaway.
Figure 4:
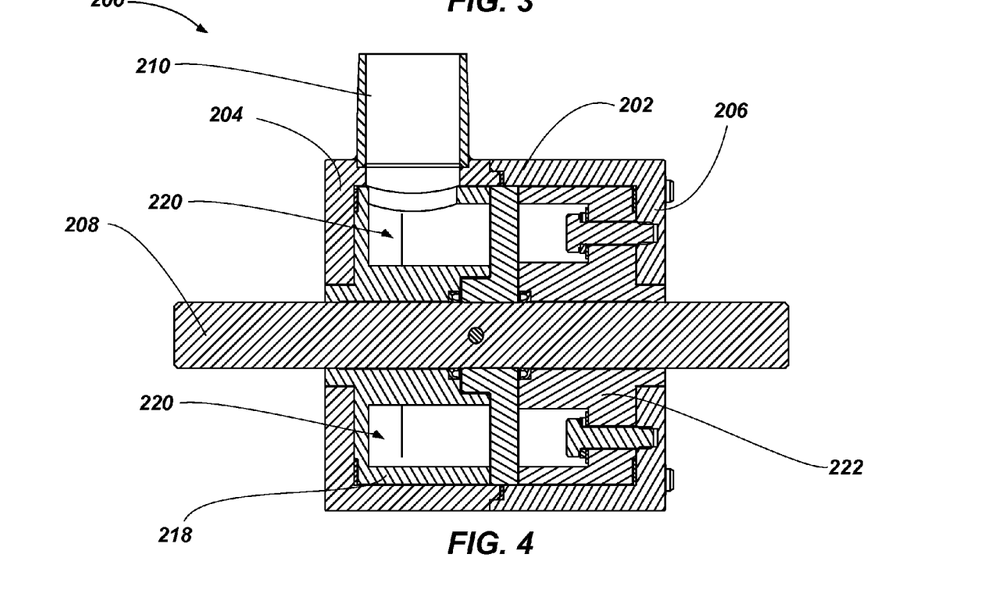
FIG. 4 is a partial cross-sectional view of the fluid distribution valve of FIG. 3.

FIG. 3 is a perspective view of a fluid distribution valve 200 with a portion of the fluid distribution valve 200 being cutaway that may be similar to the fluid distribution valve 126 shown and described with reference to FIG. 2. Fluid distribution valve 200 may be utilized in the fluid distribution assembly 120 of the fluid distribution system 101 of the cabinet assembly as shown in FIGS. 1 and 2. FIG. 4 is a partial cross-sectional view of the fluid distribution valve 200 and FIG. 5 is an exploded view of the fluid distribution valve 200.

Figure 5:
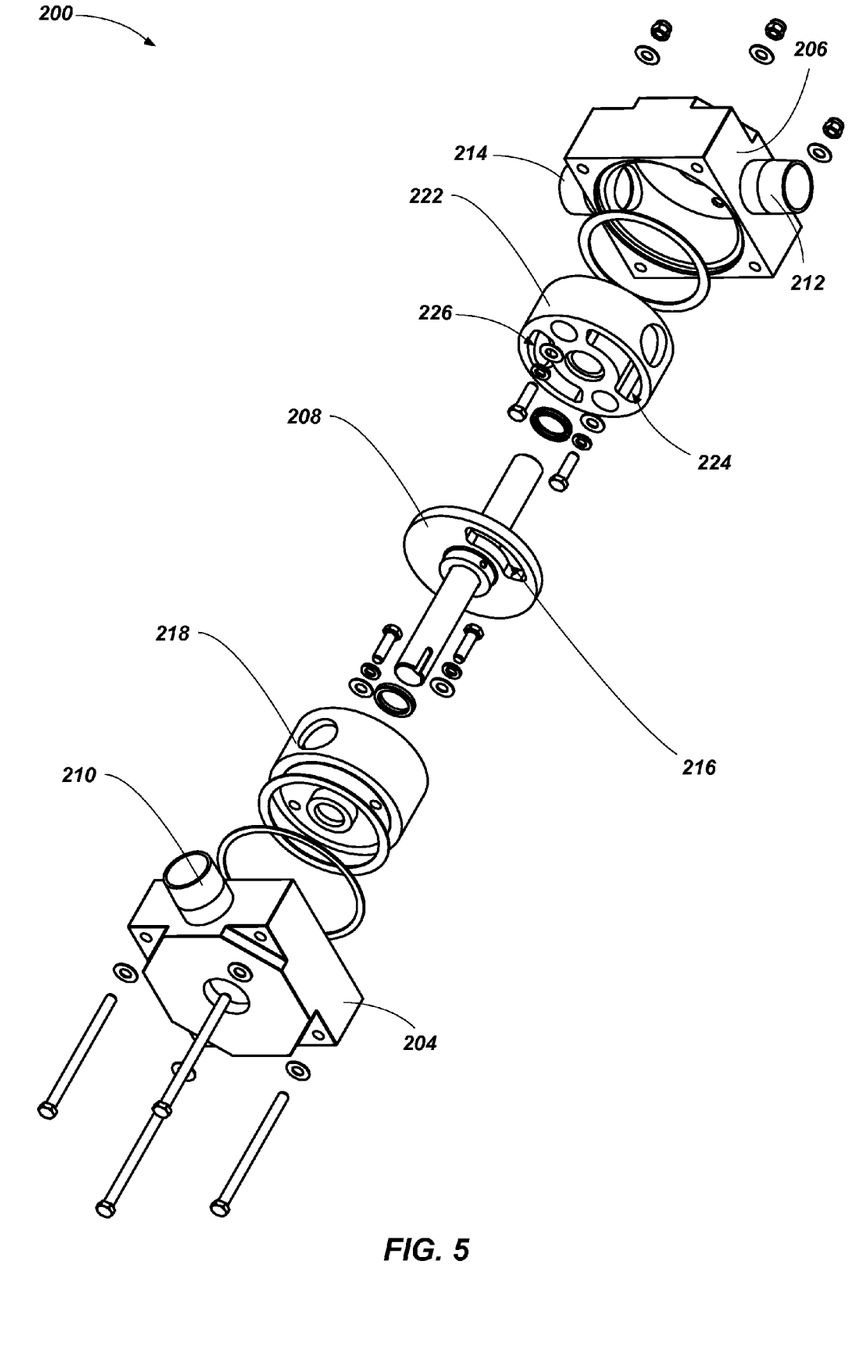
FIG. 5 is an exploded view of the fluid distribution valve of FIG. 3.

As shown in FIGS. 3, 4, and 5, the fluid distribution valve 200 may include a housing 202 (e.g., formed from two housing portions 204, 206). The fluid distribution valve 200 includes a diverter 208 for controlling fluid flow through the fluid distribution valve 200 between a fluid inlet 210 and one or more fluid outlets (e.g., a first fluid outlet 212 and a second fluid outlet 214). The diverter 208 includes a shaft 209 (e.g., coupled to the drive shaft 140 of the motor 138 shown in FIG. 2) for moving (e.g., rotating) the diverter 208 within the housing 202 of the fluid distribution valve 200 and a plate 211 having one or more apertures 216 formed therein.

An inlet chamber 220 (e.g., formed in an inlet member 218) is positioned within housing portion 204 proximate and in fluid communication with the fluid inlet 210. One or more chambers (e.g., a first outlet chamber 224 and a second outlet chamber 226 formed in an outlet member 222) are positioned within housing portion 204 proximate and in fluid communication with one of the fluid outlets 212, 214. For example, the first outlet chamber 224 in the outlet member 222 may be positioned proximate and in fluid communication with the first fluid outlet 212 and the second outlet chamber 226 in the outlet member 222 may be positioned proximate and in fluid communication with the second fluid outlet 214.

As depicted, the fluid distribution valve 200 may include one or more seals to minimize or substantially prevent fluid leakage between the components of the fluid distribution valve 200.

In some embodiments, each of the outlet chambers 224, 226 and the aperture 216 of the diverter 208 may have an arcuate shape and the inlet chamber 220 of the inlet member may have a circular shape.

In operation, fluid enters the fluid distribution valve 200 through the fluid inlet 210 and into the inlet chamber 220 in the inlet member 218. As the diverter 208 rotates, a majority of the aperture 216 in the diverter 208 will selective place fluid within the inlet chamber 220 in the inlet member 218 in communication with one of the outlet chambers 224, 226 in the outlet member 222 and one of the fluid outlets 212, 214. It is noted that while the aperture 216 of the diverter 208 transitions between the chambers 224, 226 in the outlet member 222, the aperture 216 of the diverter 208 may allow fluid communication with both chambers 224, 226.

Embodiments of the instant disclosure may particular useful in providing wash systems for use in meat-handling facilities that reduce the amount of fluid (e.g., water) utilized in processes for cleaning at least a portion of carcasses being processed in the meat-handling facilities as compared to conventional washing and fluid distribution systems. For example, by alternating fluid between nozzle assemblies, the amount of fluid provided may be reduced (e.g., reduced 30% to 50%) as compared to conventional washing and fluid distribution systems where the fluid is constantly spraying from the nozzle assemblies of the washing and fluid distribution systems.

In conventional washing and fluid distribution systems, each washing device employed in the meat-handling facilities may consume a relatively large amount of water (e.g., a large volume of water applied at a relatively high pressure and flow rate) as the water is constantly left on in order to continually spray animal carcasses that are transported through the washing device. For example, a facility may implement a fluid prewash (e.g., fluid composed of water and/or other chemicals, such as, for example, bromine, lactic acid, etc.) to remove any unwanted elements on the carcass (e.g., hair, debris, and foreign contaminants). Such a prewash may consume a large amount of water that may not be available for recirculation due to the containments in the water after application of the water to one or more animal carcasses. Fluid distribution systems in accordance with the instant disclosure may be particular useful in such a fluid prewash, thereby, reducing the overall amount of water used in such a process.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure encompasses all modifications, variations, combinations, and alternatives falling within the scope of the disclosure as defined by the following appended claims and their legal equivalents.

What is claimed is:

1. A fluid distribution system for use in a meat-handling facility, comprising:
    a plurality of nozzle assemblies, wherein a first nozzle assembly of the plurality of nozzle assemblies is positioned over a second nozzle assembly of the plurality of nozzle assemblies; and
    a fluid distribution assembly comprising at least one valve for alternately supplying fluid to the first nozzle assembly and the second nozzle assembly of the plurality of nozzle assemblies, wherein the at least one valve comprises:
a housing;
at least one fluid inlet configured to be coupled to the fluid supply;
at least two fluid outlets, a first fluid outlet of the at least two fluid outlets fluidly coupled to the first nozzle assembly, a second fluid outlet of the at least two fluid outlets fluidly coupled to the second nozzle assembly;
a diverter disposed within the housing and having at least one aperture formed therein;
an inlet chamber formed within the housing and positioned on one side of the diverter; and
at least two outlet chambers formed within the housing and positioned on another side of the diverter, wherein:
the diverter is configured to selectively position the at least one fluid inlet in communication with the first fluid outlet via the inlet chamber, the at least one aperture of the diverter, and one outlet chamber of the at least two outlet chambers when the diverter is in a first position, and
the diverter is configured to selectively position the at least one fluid inlet in communication with the second fluid outlet via the inlet chamber, the at least one aperture of the diverter, and another outlet chamber of the at least two outlet chambers when the diverter is in a second position.

2. The fluid distribution system of claim 1, wherein, in the first position, the at least one valve of the fluid distribution assembly is configured to supply fluid only to a first set of nozzle assemblies of the plurality of nozzle assemblies, and, in the second position, the at least one valve of the fluid distribution assembly is configured to supply fluid only to a second set of nozzle assemblies of the plurality of nozzle assemblies.

3. The fluid distribution system of claim 1, wherein the nozzle assemblies of the first set of nozzle assemblies and the second set of nozzle assemblies are vertically positioned in alternating rows such that at least one nozzle assembly of the first set of nozzle assemblies is positioned adjacent to at least one nozzle assembly of the second set of nozzle assemblies.

4. The fluid distribution system of claim 1, further comprising at least one motor, the at least one motor configured to separately oscillate the first set of nozzle assemblies and the second set of nozzle assemblies in a first direction and a second, opposing direction, the at least one motor configured to move the first set of nozzle assemblies in the first direction while moving the second set of nozzle assemblies the second, opposing direction and configured to move the second set of nozzle assemblies in the first direction while moving the first set of nozzle assemblies the second, opposing direction.

5. The fluid distribution system of claim 4, wherein the at least one motor configured to separately oscillate the first set of nozzle assemblies and the second set of nozzle assemblies is further configured to rotate a diverter of the at least one valve assembly to alternately supply fluid to the first nozzle assembly and the second nozzle assembly of the plurality of nozzle assemblies.

6. The fluid distribution system of claim 1, wherein the at least one valve of the fluid distribution assembly is configured to supply fluid to the nozzle assemblies of the first set of nozzle assemblies and the second set of nozzle assemblies when the nozzle assemblies are moving in the first direction.

7. The fluid distribution system of claim 6, wherein the first direction comprises a rotational downward direction extending toward a surface on which the fluid distribution system is disposed, and wherein the second direction comprises a rotational upward direction extending away from the surface on which the fluid distribution system is disposed.

8. The fluid distribution system of claim 1, wherein each of the plurality of nozzle assemblies comprises a plurality of nozzles positioned along a longitudinal axis of each nozzle assembly of the plurality of nozzle assemblies.

9. The fluid distribution system of claim 8, further comprising at least one motor, the at least one motor configured to oscillate each of the plurality of nozzle assemblies and the plurality of nozzles about the longitudinal axis of each nozzle assembly of the plurality of nozzle assemblies.

10. A cabinet assembly for use in a meat-handling facility, comprising:
a housing defining a pathway through the cabinet assembly between a first lateral side of the housing and a second lateral side of the housing, the pathway for conveying at least a portion of a carcass through the housing;
a first plurality of nozzle assemblies disposed on the first lateral side of the housing, the first plurality of nozzle assemblies comprising a first set of nozzle assemblies and a second set of nozzle assemblies, wherein at least one nozzle assembly of the first set of nozzle assemblies is positioned over at least one nozzle assembly of the second set of nozzle assemblies;
a second plurality of nozzle assemblies disposed on the second lateral side of the housing, the second plurality of nozzle assemblies comprising a third set of nozzle assemblies and a fourth set of nozzle assemblies, wherein at least one nozzle assembly of the third set of nozzle assemblies is positioned over at least one nozzle assembly of the fourth set of nozzle assemblies; and
a fluid distribution assembly comprising at least one valve for alternately supplying fluid between the first set of nozzle assemblies and the second set of nozzle assemblies of the first plurality of nozzle assemblies and for alternately supplying fluid between the third set of nozzle assemblies and the fourth set of nozzle assemblies of the second plurality of nozzle assemblies,
wherein the at least one valve comprises:
a housing;
at least one fluid inlet configured to be coupled to the fluid supply;
at least two fluid outlets, a first fluid outlet of the at least two fluid outlets fluidly coupled to the first set of nozzle assemblies and the third set of nozzle assemblies, a second fluid outlet of the at least two fluid outlets fluidly coupled to the second set of nozzle assemblies and the fourth set of nozzle assemblies;
a diverter disposed within the housing and having at least one aperture formed therein;
an inlet chamber formed within the housing and positioned on one side of the diverter; and
at least two outlet chambers formed within the housing and positioned on another side of the diverter, wherein:
the diverter is configured to selectively position the at least one fluid inlet in communication with the first fluid outlet via the inlet chamber, the at least one aperture of the diverter, and one outlet chamber of the at least two outlet chambers in a first position, and the diverter is configured to selectively position the at least one fluid inlet in communication with the second fluid outlet via the inlet chamber, the at least one aperture of the diverter, and another outlet chamber of the at least two outlet chambers in a second position.

11. The cabinet assembly of claim 10, wherein the first set of nozzle assemblies is positioned within the cabinet assembly in an alternating pattern with the second set of nozzle assemblies such that each nozzle assembly of the first set of nozzle assemblies is positioned adjacent to at least one nozzle assembly of the second set of nozzle assemblies, and wherein the third set of nozzle assemblies is positioned within the cabinet assembly in another alternating pattern with the fourth set of nozzle assemblies such that each nozzle assembly of the third set of nozzle assemblies is positioned adjacent to at least one nozzle assembly of the fourth set of nozzle assemblies.

12. The cabinet assembly of claim 10, wherein the first set of nozzle assemblies and the second set of nozzle assemblies in the cabinet assembly are positioned in a direction transverse to the pathway, and wherein the third set of nozzle assemblies and the fourth set of nozzle assemblies in the cabinet assembly are positioned in the direction transverse to the pathway.

13. The cabinet assembly of claim 12, wherein the first set of nozzle assemblies and the second set of nozzle assemblies are configured to oscillate in opposing rotational directions transverse to the pathway, and wherein the third set of nozzle assemblies and the fourth set of nozzle assemblies are configured to oscillate in opposing rotational directions transverse to the pathway.

14. The cabinet assembly of claim 13, wherein the at least one valve of the fluid distribution assembly is configured to supply fluid to the first set of nozzle assemblies, the second set of nozzle assemblies, the third set of nozzle assemblies, and the fourth set of nozzle assemblies when the nozzle assemblies are oscillating in a first direction, and wherein the at least one valve of the fluid distribution assembly is configured to cease supply of fluid to the first set of nozzle assemblies, the second set of nozzle assemblies, the third set of nozzle assemblies, and the fourth set of nozzle assemblies when the nozzle assemblies are oscillating in a second direction opposing the first direction.

15. The cabinet assembly of claim 10, wherein the diverter of the at least one valve assembly is rotatably mounted within the housing of the valve assembly such that a plate of the diverter having the at least one aperture extending therethrough may be rotated about a shaft of the diverter between the first position and the second position.

* * * * *